United States Patent Office 2,722,520
Patented Nov. 1, 1955

2,722,520

PREPARATION OF OXETANE POLYMERS

George E. Hulse, Newark, Del., assignor to Hercules Powder Company, Wilmington, Del., a corporation of Delaware No Drawing. Application January 25, 1954,
Serial No. 406,094

10 Claims. (Cl. 260—2)

This invention relates to an improved process for the preparation of polymers of 3,3-bis(chloromethyl)oxetane.

Polymers of 3,3-bis(chloromethyl)oxetane are valuable, new synthetic polymeric materials for use in the production of plastic articles, films, filaments, etc. These polymers may be prepared by contacting 3,3-bis(chloromethyl)oxetane with a catalyst such as boron trifluoride or its molecular complexes in an inert organic solvent as the reaction medium. However, while high molecular weight polymers may be obtained when the polymerization is carried out in an organic solvent, the polymerization proceeds through a viscous solution or dope before the polymer starts to precipitate and at about 20–30% conversion, the reaction mixture takes on a rubbery consistency which makes both mixing and temperature control very difficult and may even, at high conversions, set to a complete solid or gel. Even if the reaction is carried out in fairly dilute solutions, the polymer separates in large and tough or rubbery lumps which must be shredded before the polymer can be purified, as, for example, treated with alcohol to destroy the catalyst, etc.

Now, in accordance with this invention, it has been discovered that the polymerization of 3,3-bis(chloromethyl)oxetane may be carried out in liquid sulfur dioxide as a reaction medium and that when the polymerization is so carried out, the polymer is produced in a form which is readily separated and purified. When liquid sulfur dioxide is used as the reaction medium, the polymer precipitates as a soft, dry-appearing product which is completely free of the sticky and rubbery properties obtained when an organic solvent is used, and it is then possible to maintain the desired agitation during the reaction and maintain a more accurate temperature control. The polymer is also in a form which can be directly slurried with alcohol or other solvent to destroy the catalyst, without any intermediate shredding or other process of breaking up the polymer. It may then be recovered from the slurry by filtration.

The following examples will illustrate the improved process of polymerizing 3,3-bis-(chloromethyl)oxetane in accordance with this invention. All parts and percentages are by weight unless otherwise indicated.

Example 1

A slow stream of nitrogen was passed into a solution of 161 parts of 3,3-bis(chloromethyl)oxetane and 360 parts of anhydrous liquid sulfur dioxide held at a temperature of −25° C. Into the nitrogen stream was bled 2.3 parts of gaseous boron trifluoride during a period of 15 minutes. By the time the boron trifluoride addition was complete, the reaction mixture was turbid and at the end of 45 minutes it was quite curdy but still fluid. At the end of 75 minutes, the reaction mixture was lumpy but the lumps were quite dry and no trouble was encountered in maintaining agitation of the reaction mixture. The polymerization was allowed to proceed at −25° C. for a total of 3 hours. At the end of this time, 250 parts of methanol at −25° C. was added and on continuing the agitation, a smooth slurry resulted. Essentially none of the polymer adhered either to the agitator blades or to the glass wall of the reactor. The polymer was removed by filtration, washed with methanol, and dried at 60° C. under vacuum for 18 hours. A yield of 121 parts of dry polymer (75% conversion) was obtained. The specific viscosity at 50° C. of a 1% cyclohexanone solution of the polymer so produced was 1.668.

Example 2

A polymerization vessel was charged with 7.42 parts of 3,3-bis(chloromethyl)oxetane and 10.64 parts of commercial sulfur dioxide and cooled to −20° C. Boron trifluoride gas (0.14 part) was injected and the polymerization was allowed to proceed at −20° C. for 1 hour. The polymer mass was tender and readily slurried with methanol. The polymer was separated by filtration and dried. There was obtained 3.92 parts (53% conversion) of polymer. A 1% cyclohexanone solution of the polymer so produced had a specific viscosity of 1.244 at 50° C.

Example 3

A polymerization vessel was charged with 0.36 part of an acetonitrile-boron trifluoride complex (melting point of 85° C.) and sulfur dioxide was introduced until at −25° C., 20 parts of sulfur dioxide had condensed in the vessel, after which 9.1 parts of 3,3-bis(chloromethyl)oxetane was injected. The polymerization was allowed to proceed for 18 hours at −20° C. The reaction mixture was then slurried with methanol and filtered. The polymer so obtained was a fine, white powder.

Example 4

A polymerization vessel was charged with 6.5 parts of 3,3-bis(chloromethyl)oxetane and 15 parts of liquid sulfur dioxide at −20° C. Into this mixture was then injected 0.25 part of a freshly prepared and distilled acetic acid-boron trifluoride complex. The polymerization was allowed to proceed for 18 hours at −20° C. Methanol was then added and the slurry was filtered. The polymer was a fine, white powder.

Example 5

A glass polymerization vessel was charged with 6.5 parts of 3,3-bis(chloromethyl)oxetane and 15 parts of liquid sulfur dioxide. After cooling the contents to −20° C., 0.12 part of gaseous hydrogen fluoride was injected. The polymerization was allowed to proceed at −20° C. for 18 hours. The reaction mixture was easily slurried in methanol and on filtration yielded 2.9 parts (44.5% conversion) of fine, white polymer. A 1% solution of the polymer in cyclohexanone had a specific viscosity of 0.211 at 50° C.

Example 6

A polymerization vessel was charged with 6.5 parts of 3,3-bis(chloromethyl)oxetane and 15 parts of liquid sulfur dioxide, the contents cooled to −20° C., and 0.41 part of a freshly distilled boron trifluoride etherate was injected. The polymerization was allowed to proceed at −20° C. for 18 hours. Methanol was then added and the slurry was filtered whereby there was obtained 3.1 parts (47.7% conversion) of polymer.

In accordance with this invention, it has been found that liquid sulfur dioxide may be used as the reaction medium for carrying out the polymerization of 3,3-bis(chloromethyl)oxetane. The liquid sulfur dioxide functions solely as a reaction medium and hence the amount of it used in the process is not critical. The solubility of 3,3-bis(chloromethyl)oxetane in liquid sulfur dioxide decreases to some extent as the temperature is lowered. Thus, if it is desired to carry out the polymerization at minimum temperatures, as, for example, around —50° to —80° C., it is then desirable to use a more dilute solution of the monomer in the liquid sulfur dioxide. If temperatures in the range of —10° to —35° C. are used, obviously much higher concentrations of monomer may be used. In general, solutions of 3,3-bis(chloromethyl)-oxetane in liquid sulfur dioxide containing from 10–80% monomer are used. At the higher concentrations, on carrying out the polymerization to a conversion of 70–80%, a hard polymer mass may be obtained, but in any event it is readily processed. At lower concentrations, as, for example, at concentrations of approximately 2 volumes of the solvent to 1 of the monomer, a soft, dry-appearing polymer is obtained which is very easily processed. The monomer concentration has no effect on the quality of the polymer and hence the concentration to be used will be determined on the basis of reaction rate, temperature at which the reaction is carried out, and the scale at which the polymer is to be produced.

In carrying out the polymerization of 3,3-bis(chloromethyl)oxetane in liquid sulfur dioxide, hydrogen fluoride, boron trifluoride, or a boron trifluoride complex may be used to catalyze the polymerization reaction. Among the boron trifluoride complexes which are capable of polymerizing the oxetanes, may be mentioned boron trifluoride etherates such as the complex of boron trifluoride with diethyl ether, boron trifluoride-alkanoic acid complexes such as boron trifluoride-acetic acid complex (fluoroboroacetic acid), and any other complex of boron trifluoride with an organic compound, as, for example, acetic anhydride, acetonitrile, etc. The amount of catalyst used will depend upon the temperature at which the polymerization is carried out, the desired rate of polymerization, etc. For example, the rate of polymerization increases as the catalyst concentration increases up to a reasonable point. In like manner the temperature affects the rate of polymerization. In general, the amount of catalyst used will be within from about 0.1 to about 10% based on the monomer and preferably will be from about 1 to about 7.5%. The rate of polymerization is additionally accelerated by carrying out the polymerization in the presence of a trace of water as is characteristic with most ionic or cationic type polymerization reactions. Obviously, the amount of water is most minute and should be held below about 1000 parts per million.

The temperature at which the polymerization reaction is carried out will depend upon the molecular weight desired for the polymer, the concentration of the monomer solution that is to be polymerized, the pressure at which the reaction is carried out, etc. In general, the molecular weight of the 3,3-bis(chloromethyl)oxetane polymer produced increases with a decrease in temperature. At the same time, the rate of the polymerization is also reduced and hence the catalyst concentration may be increased in order to accelerate the rate. The temperature at which the polymerization is carried out in liquid sulfur dioxide will generally be between about —80° C. and 25° C. and preferably will be within the range of from about —50° to about 0° C.

The process as carried out in accordance with this invention may be varied in many ways. As may be seen from the foregoing examples, the 3,3-bis(chloromethyl)-oxetane may be dissolved in the liquid sulfur dioxide and the catalyst then added, or the 3,3-bis(chloromethyl)-oxetane may be added to a solution of the catalyst in the liquid sulfur dioxide. The reaction may be carried out at subatmospheric, atmospheric, or superatmospheric pressure. Autogenous pressure is desirable since by this means the heat liberated in the polymerization can be controlled by vaporizing the solvent (SO₂), condensing it with an external condenser, and returning the liquid to the reactor. The process may be operated as a batch or continuous process.

As pointed out above, when liquid sulfur dioxide is used as the reaction medium, the polymer is produced in a form which is very easily processed. It may be separated from the reaction mixture by a variety of methods. The liquid sulfur dioxide may be removed by distillation and the polymer then treated to destroy the catalyst, as, for example, by slurrying it with methanol or other alcohol, or the alcohol may be added directly to the liquid sulfur dioxide polymer reaction mixture. In any event, the polymer is always produced in a form that is soft and which, when mixed with the alcohol used to destroy the catalyst, forms a smooth slurry. It is then very easy to separate the polymer by filtration. The process of this invention, therefore, enables the direct production of a finely divided polymeric material in the form of a free-flowing powder, without the necessity of resorting to shredding devices or other means for breaking up the hard polymeric masses which are otherwise normally produced.

Another advantage of the process of this invention is that the polymer is produced in fine, discrete particles of uniform size in the range of from about 5 to about 25 microns. This fine, uniform particle size is, of course, important in many of the applications for which these polymers are used.

What I claim and desire to protect by Letters Patent is:

1. The process of preparing a polymer of 3,3-bis(chloromethyl)oxetane which comprises contacting a solution of 3,3-bis(chloromethyl)oxetane in liquid sulfur dioxide at a temperature of from about 25° C. to about —80° C. with a catalyst selected from the group consisting of hydrogen fluoride, boron trifluoride, and molecular complexes of boron trifluoride capable of polymerizing said 3,3-bis(chloromethyl)oxetane.

2. The process of preparing a polymer of 3,3-bis(chloromethyl)oxetane which comprises contacting a solution of 3,3-bis(chloromethyl)oxetane in liquid sulfur dioxide at a temperature of from about 25° C. to about —80° C. with hydrogen flouride as a catalyst.

3. The process of preparing a polymer of 3,3-bis(chloromethyl)oxetane which comprises contacting a solution of 3,3-bis(chloromethyl)oxetane in liquid sulfur dioxide at a temperature of from about 25° C. to about —80° C. with boron trifluoride as a catalyst.

4. The process of preparing a polymer of 3,3-bis(chloromethyl)oxetane which comprises contacting a solution of 3,3-bis(chloromethyl)oxetane in liquid sulfur dioxide at a temperature of from about 25° C. to about —80° C. with a boron trifluoride complex capable of polymerizing said 3,3-bis(chloromethyl)oxetane as a catalyst.

5. The process of preparing a polymer of 3,3-bis(chloromethyl)oxetane which comprises contacting a solution of 3,3-bis(chloromethyl)oxetane in liquid sulfur dioxide at a temperature of from about 0° C. to about —50° C. with hydrogen fluoride as a catalyst.

6. The process of preparing a polymer of 3,3-bis(chloromethyl)oxetane which comprises contacting a solution of 3,3-bis(chloromethyl)oxetane in liquid sulfur dioxide at a temperature of from about 0° C. to about —50° C. with boron trifluoride as a catalyst.

7. The process of preparing a polymer of 3,3-bis(chloromethyl)oxetane which comprises contacting a solution of 3,3-bis(chloromethyl)oxetane in liquid sulfur dioxide at a temperature of from about 0° C. to about —50° C. with a boron trifluoride complex capable of polymerizing said 3,3-bis(chloromethyl)oxetane as a catalyst.

8. The process of preparing a polymer of 3,3-bis(chloromethyl)oxetane which comprises contacting a solution of 3,3-bis(chloromethyl)oxetane in liquid sulfur dioxide at a temperature of from about 0° C. to about —50° C. with hydrogen fluoride as a catalyst, forming a slurry of the polymer in methanol, and separating said polymer from the slurry in the form of a free-flowing powder.

9. The process of preparing a polymer of 3,3-bis(chloromethyl)oxetane which comprises contacting a solution of 3,3-bis(chloromethyl)oxetane in liquid sulfur dioxide at a temperature of from about 0° C. to about −50° C. with boron trifluoride as a catalyst, forming a slurry of the polymer in methanol, and separating said polymer from the slurry in the form of a free-flowing powder.

10. The process of preparing a polymer of 3,3-bis(chloromethyl)oxetane which comprises contacting a solution of 3,3-bis(chloromethyl)oxetane in liquid sulfur dioxide at a temperature of from about 0° C. to about −50° C. with a boron trifluoride complex capable of polymerizing said 3,3-bis(chloromethyl)oxetane as a catalyst, forming a slurry of the polymer in methanol, and separating said polymer from the slurry in the form of a free-flowing powder.

No references cited.